(12) United States Patent
Dohi et al.

(10) Patent No.: US 11,982,325 B2
(45) Date of Patent: May 14, 2024

(54) REVERSE INPUT BLOCKING CLUTCH

(71) Applicant: NSK Ltd., Tokyo (JP)

(72) Inventors: Nagao Dohi, Fujisawa (JP); Shohei Kaneko, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/039,565

(22) PCT Filed: Oct. 28, 2022

(86) PCT No.: PCT/JP2022/040425
§ 371 (c)(1),
(2) Date: May 31, 2023

(87) PCT Pub. No.: WO2023/085127
PCT Pub. Date: May 19, 2023

(65) Prior Publication Data
US 2023/0392653 A1   Dec. 7, 2023

(30) Foreign Application Priority Data

Nov. 15, 2021   (JP) ................................ 2021-185429
Dec. 27, 2021   (JP) ................................ 2021-211833

(51) Int. Cl.
*F16D 41/08*   (2006.01)
*F16D 3/50*    (2006.01)
(Continued)

(52) U.S. Cl.
CPC ............. *F16D 41/082* (2013.01); *F16D 3/50* (2013.01); *F16D 41/10* (2013.01); *F16D 43/02* (2013.01);
(Continued)

(58) Field of Classification Search
CPC .......... F16D 3/50; F16D 41/08–41/084; F16D 41/10; F16D 43/02; F16D 51/12;
(Continued)

(56) References Cited

U.S. PATENT DOCUMENTS 3,051,282 A * 8/1962 Greene .................. F16D 67/00
                                                   74/530
3,335,831 A * 8/1967 Kalns .................... F16D 51/20
                                                   74/625

(Continued)

FOREIGN PATENT DOCUMENTS

| JP | 2011-27252 A  | 2/2011 |
| JP | 2013-148118 A | 8/2013 |

(Continued)

OTHER PUBLICATIONS

International Search Report of PCT/JP2022/040425 dated Dec. 13, 2022 [PCT/ISA/210].

(Continued)

*Primary Examiner* — Richard M Lorence
(74) *Attorney, Agent, or Firm* — Sughrue Mion, PLLC

(57) ABSTRACT

A distance between a rotation center of an input member and a contact portion between an input side engaging portion and an input side engaged portion in a second direction is set to be shorter than a distance between a rotation center of an output member and a contact portion between an output side engaging portion and an output side engaged portion in the second direction. In a locked or semi-locked state, a contact portion between the output side engaging portion and the output side engaged portion is located on the side closer to the rotation center of the output member in a first direction in relation to a virtual line connecting the rotation center of (Continued)

the output member and a contact portion between one pressing surface of the pair of pressing surfaces and the pressed surface.

2 Claims, 7 Drawing Sheets

(51) Int. Cl.
- *F16D 41/10* (2006.01)
- *F16D 43/02* (2006.01)
- *F16D 51/12* (2006.01)
- *F16D 59/00* (2006.01)
- *F16D 67/00* (2006.01)

(52) U.S. Cl.
CPC .............. *F16D 51/12* (2013.01); *F16D 59/00* (2013.01); *F16D 67/00* (2013.01)

(58) Field of Classification Search
CPC .......... F16D 59/00; F16D 59/02; F16D 63/00; F16D 65/22; F16D 67/00; F16D 67/02
See application file for complete search history.

(56) References Cited

U.S. PATENT DOCUMENTS

| | | | |
|---|---|---|---|
| 2021/0262532 A1* | 8/2021 | Toyoda | .................. F16D 67/00 |
| 2021/0277964 A1 | 9/2021 | Daikoku et al. | |
| 2022/0042555 A1 | 2/2022 | Dohi et al. | |
| 2022/0205495 A1* | 6/2022 | Dohi | ...................... F16D 43/02 |
| 2022/0268331 A1 | 8/2022 | Dohi et al. | |

FOREIGN PATENT DOCUMENTS

| | | |
|---|---|---|
| JP | 2017-20612 A | 1/2017 |
| WO | 2019/216280 A1 | 11/2019 |
| WO | 2021/054479 A1 | 3/2021 |
| WO | 2021/054480 A1 | 3/2021 |
| WO | 2021/054481 A1 | 3/2021 |
| WO | 2021/172558 A1 | 9/2021 |

OTHER PUBLICATIONS

Written Opinion of PCT/JP2022/040425 dated Dec. 13, 2022 [PCT/ISA/237].

International Search Report of PCT/JP2022/042069 dated Dec. 20, 2022 [PCT/ISA/210].

Written Opinion of PCT/JP2022/042069 dated Dec. 20, 2022 [PCT/ISA/237].

Communication dated May 10, 2023, issued in Korean Application No. 10-2023-7011974.

Notice of Allowance dated Nov. 30, 2023 in U.S. Appl. No. 18/275,724.

* cited by examiner

REVERSE INPUT BLOCKING CLUTCH

TECHNICAL FIELD

The present invention relates to a reverse input blocking clutch which transmits a rotational torque input from an input member to an output member and completely blocks a rotational torque reversely input to the output member so that the rotational torque is not transmitted to the input member or only part of the rotational torque is transmitted to the input member while the rest is blocked.

BACKGROUND ART

A reverse input blocking clutch includes an input member that is connected to a drive source input mechanism or the like and an output member that is connected to a decelerating mechanism or the like and has a function of transmitting a rotational torque input from the input member to the output member and completely blocking a rotational torque reversely input to the output member such that the rotational torque is not transmitted to the input member or only a part of the rotational torque is transmitted to the input member while the rest is blocked.

The reverse input blocking clutch is roughly classified into a locking type and a free type depending on the difference in a mechanism that blocks a rotational torque reversely input to the output member. The lock type reverse input blocking clutch includes a mechanism that prevents the rotation of the output member when a rotational torque is reversely input to the output member. On the other hand, the free type reverse input blocking clutch includes a mechanism that revolves the output member when a rotational torque is input to the output member. The use of any one of the lock type reverse input blocking clutch and the free type reverse input blocking clutch is appropriately determined depending on the application of the device incorporating the reverse input blocking clutch.

The pamphlet of WO 2021/054481 describes the lock type reverse input blocking clutch. The reverse input blocking clutch described in the pamphlet of WO 2021/054481 includes an input member having a pair of input side engaging portions, an output member having an output side engaging portion, a pressed member having a pressed surface, and an engagement element having an engagement element body and a link member. The engagement element body includes an output side engaged portion which engages with the output side engaging portion and a swing support portion which is located on the side closer to the pressed surface than the input side engaging portion. The link member includes a first end portion which is connected to the swing support portion in a swingable manner and a second end portion which is connected to the input side engaging portion in a swingable manner.

In the reverse input blocking clutch described in the pamphlet of WO 2021/054481, the engagement element is configured to be displaced in a direction moving away from the pressed surface so that the output side engaged portion engages with the output side engaging portion to transmit the rotational torque input to the input member to the output member in such a manner that the input side engaging portion pulls the swing support portion through the link member when the rotational torque is input to the input member and is configured to press the pressing surface against the pressed surface so that the pressing surface frictionally engages with the pressed surface based on that the output side engaging portion engages with the output side engaged portion when the rotational torque is reversely input to the output member.

According to the reverse input blocking clutch described in the pamphlet of WO 2021/054481, the state (locked or semi-locked state) in which the pressing surface is pressed against the pressed surface can be smoothly switched to the state (unlocked or semi-unlocked state) in which the pressing surface is separated from the pressed surface when the rotational torque is input to the input member.

SUMMARY OF INVENTION

Technical Problem

Since the reverse input blocking clutch described in the pamphlet of WO 2021/054481 configures the engagement element to include the engagement element body and the link member, the number parts is large, the parts management and assembly costs increase, and hence manufacturing costs increase.

The present invention has been made in view of the above-described circumstances and an object thereof is to realize a structure of a reverse input blocking clutch capable of smoothly switching a state (locked or semi-locked state) in which a pressing surface is pressed against a pressed surface to a state (unlocked or semi-unlocked state) in which the pressing surface is separated from the pressed surface when a rotational torque is input to the input member and reducing manufacturing cost.

Solution to Problem

A reverse input blocking clutch according to an aspect of the present invention includes a pressed member, an input member, an output member, and an engagement element.

The pressed member includes a pressed surface provided on an inner peripheral surface.

The input member includes at least one input side engaging portion disposed on a radial inside of the pressed surface and is disposed coaxially with the pressed surface.

The output member includes an output side engaging portion disposed on the radial inside in relation to the input side engaging portion on the radial inside of the pressed surface and is disposed coaxially with the pressed surface.

The engagement element includes a pair of pressing surfaces each facing the pressed surface and circumferentially separated from each other, an input side engaged portion engageable with the input side engaging portion, and an output side engaged portion engageable with the output side engaging portion and is disposed to be movable in a first direction as a far and near direction with respect to the pressed surface.

The engagement element is configured to be displaced in a direction moving away from the pressed surface in the first direction based on that the input side engaging portion engages with the input side engaged portion when the rotational torque is input to the input member and is configured to transmit a rotational torque input to the input member to the output member based on that the output side engaged portion engages with the output side engaging portion and the engagement element is configured to press the pressing surface against the pressed surface so that the pressing surface frictionally engages with the pressed surface based on that the output side engaging portion engages with the output side engaged portion when a rotational torque is reversely input to the output member.

Particularly, in the reverse input blocking clutch according to an aspect of the present invention, in a state in which the pair of pressing surface is pressed against the pressed surface in accordance with the rotation of the output member in a predetermined direction and the input side engaging portion engages with the input side engaged portion in accordance with the rotation of the input member in a direction opposite to the predetermined direction, a distance between a rotation center of the input member and a contact portion between the input side engaging portion and the input side engaged portion in a second direction orthogonal to both the first direction and the rotation center of the input member is shorter than the distance between a rotation center of the output member and a contact portion between the output side engaging portion and the output side engaged portion in the second direction.

In a state in which the rotational torque is reversely input to the output member and the pair of pressing surfaces contacts the pressed surface, the contact portion between the output side engaging portion and the output side engaged portion is located on the side closer to the rotation center of the output member in the first direction in relation to a virtual line connecting a contact portion between one pressing surface of the pair of pressing surfaces and the pressed surface and the rotation center of the output member.

The reverse input blocking clutch according to an aspect of the present invention can include a pair of the engagement elements and the input member can include a pair of the input side engaging portions.

Advantageous Effects of Invention

According to the reverse input blocking clutch of an aspect of the present invention, it is possible to smoothly switch a state (locked or semi-locked state) in which a pressing surface is pressed against a pressed surface to a state (unlocked or semi-unlocked state) in which the pressing surface is separated from the pressed surface when a rotational torque is input to an input member and to reduce a manufacturing cost.

DESCRIPTION OF EMBODIMENTS

Figure 1:
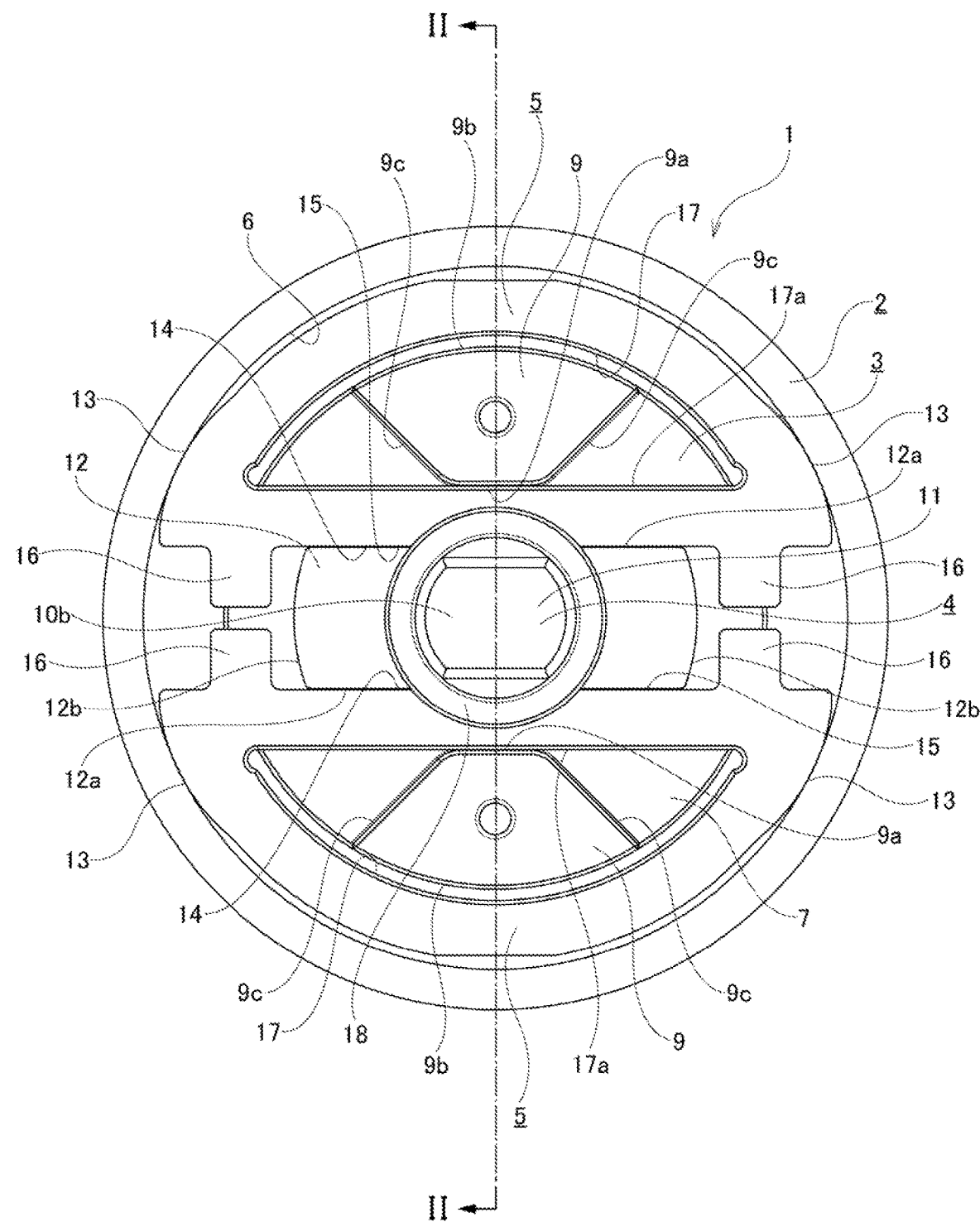
FIG. 1 is a cross-sectional view of a reverse input blocking clutch according to an example of the embodiment when viewed from an output member side.
Figure 2:
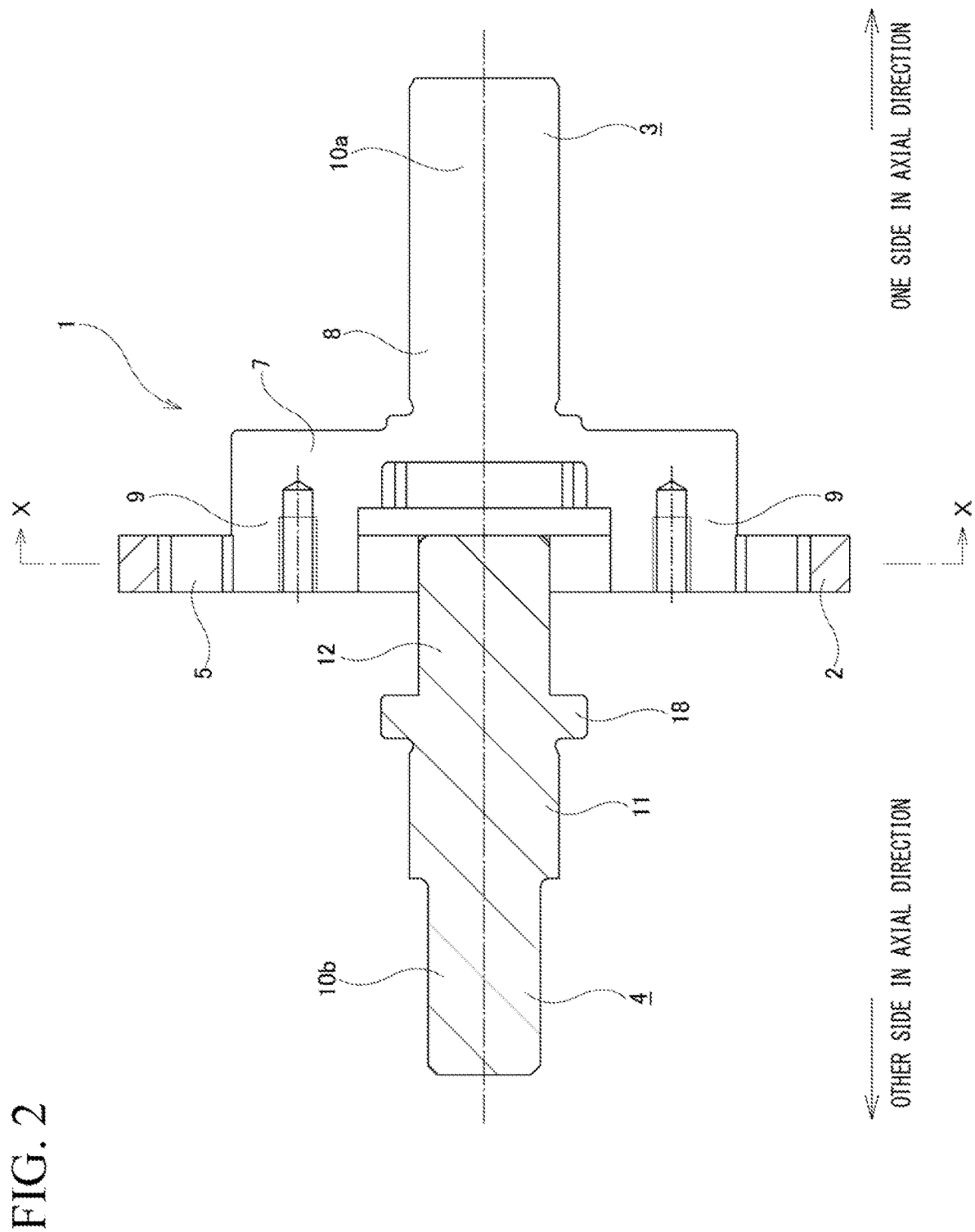
FIG. 2 is a cross-sectional view taken along a line II-II of FIG. 1.

An example of an embodiment will be described with reference to FIGS. 1 to 6C. Additionally, an axial direction, a radial direction, and a circumferential direction refer to an axial direction, a radial direction, and a circumferential direction of a reverse input blocking clutch 1 unless otherwise specified. In this example, the axial direction, the radial direction, and the circumferential direction of the reverse input blocking clutch 1 coincide with an axial direction, a radial direction, and a circumferential direction of an input member 3 and an axial direction, a radial direction, and a circumferential direction of an output member 4. One axial side refers to the side of the input member 3 (the right side of FIG. 2) and the other axial side refers to the side of the output member 4 (the left side of FIG. 2).

[Description of Structure of Reverse Input Blocking Clutch]

The reverse input blocking clutch 1 of this example includes a pressed member 2, the input member 3, the output member 4, and a pair of engagement elements 5. The reverse input blocking clutch 1 has a reverse input blocking function of transmitting a rotational torque input to the input member 3 to the output member 4 and completely blocking a rotational torque reversely input to the output member 4 such that the rotational torque is not transmitted to the input member 3 or only part of the rotational torque is transmitted to the input member 3 while the rest is blocked. Additionally, in the following description, a case in which the rotation direction of the input member 3 is the counterclockwise direction and the rotation direction of the output member 4 is the clockwise direction will be mainly described, but the present invention is not limited thereto. That is, the reverse input blocking clutch 1 of this example can block (lock) and unlock the reverse input rotational torque regardless of the rotation direction (torque input direction).

The pressed member 2 has a cylindrical shape and is fixed to, for example, the other member (not shown) such as a housing or is integrally provided with the other member to restrict its rotation. The pressed member 2 includes a pressed surface 6 which is a cylindrical concave surface on the inner peripheral surface.

The input member 3 is connected to an input side mechanism such as an electric motor and a rotational torque is input thereto. The input member 3 includes a substrate portion 7, an input shaft portion 8, and a pair of input side engaging portions 9.

The substrate portion 7 has a substantially circular end surface shape when viewed from the axial direction.

The input shaft portion 8 protrudes from the center portion of one axial side surface of the substrate portion 7 toward one axial side. The input shaft portion 8 includes an input side connection portion 10a provided at one axial portion to transmit a torque to the output portion of the input side mechanism. In this example, the input side connection portion 10a has a double sided shape including a pair of flat surfaces parallel to each other on the outer peripheral surface. However, the input side connection portion 10a can have any shape if the input side connection portion can be connected to the output portion of the input side mechanism to transmit a torque.

The pair of input side engaging portions 9 has a substantially fan-shaped or substantially trapezoidal end surface shapes when viewed from the axial direction and protrudes from two positions on the other axial side of the substrate portion 7 on the opposite radial side to the other axial side. The pair of input side engaging portions 9 is separated from each other in the radial direction of the input member 3. Therefore, each of the input side engaging portions 9 is disposed on a portion on the other axial side of the substrate portion 7 that is radially outwardly deviated from the rotation center O. Each input side engaging portion 9 has a symmetrical shape with respect to the circumferential direction.

In this example, radial inner side surfaces 9a of the input side engaging portions 9 are formed by flat surfaces parallel to each other and radial outer side surfaces 9b of the input side engaging portions 9 have the same cylindrical contour shape as the outer peripheral surface of the substrate portion 7. A pair of circumferential side surfaces 9c of the input side engaging portions 9 is formed by flat surfaces which are inclined in a direction moving away from each other as it goes outward in the radial direction.

The output member 4 is connected to an output side mechanism such a deceleration mechanism and outputs a rotational torque. The output member 4 is disposed coaxially with the input member 3. In this example, the output member 4 includes an output shaft portion 11 and an output side engaging portion 12.

The output shaft portion 11 includes a flange portion 18 provided at one axial portion to protrude outward in the radial direction and includes an output side connection portion 10b provided at the other axial portion to transmit a torque to the input portion of the output side mechanism. In this example, the output side connection portion 10b has a double sided shape including a pair of flat surfaces parallel to each other on the outer peripheral surface. However, the output side connection portion 10b can have any shape if the output side connection portion can be connected to the input portion of the output side mechanism to transmit a torque.

The output side engaging portion 12 has a cam function. That is, the distance from the rotation center O of the output member 4 to the outer peripheral surface of the output side engaging portion 12 is not constant in the circumferential direction. In this example, the output side engaging portion 12 has a substantially rectangular or substantially elliptical end surface shape when viewed from the axial direction and protrudes from the center portion of one axial end surface of the output shaft portion 11 toward one axial side. That is, the outer peripheral surface of the output side engaging portion 12 is formed by a pair of flat surfaces 12a parallel to each other and a pair of convex curved surfaces 12b each having a partially cylindrical surface shape. Therefore, the distance from the rotation center O of the output member 4 to the outer peripheral surface of the output side engaging portion 12 is not constant in the circumferential direction. Additionally, in this example, the pair of convex curved surfaces 12b is formed by partial cylindrical surfaces centered on the rotation center O of the output member 4.

The output side engaging portion 12 is symmetrical with respect to a virtual plane passing through the rotation center O of the output member 4 and orthogonal to the pair of flat surfaces 12a and is symmetrical with respect to a virtual plane passing through the rotation center O of the output member 4 and parallel to the pair of flat surfaces 12a. Such an output side engaging portion 12 is disposed between the pair of input side engaging portions 9.

Figure 3:
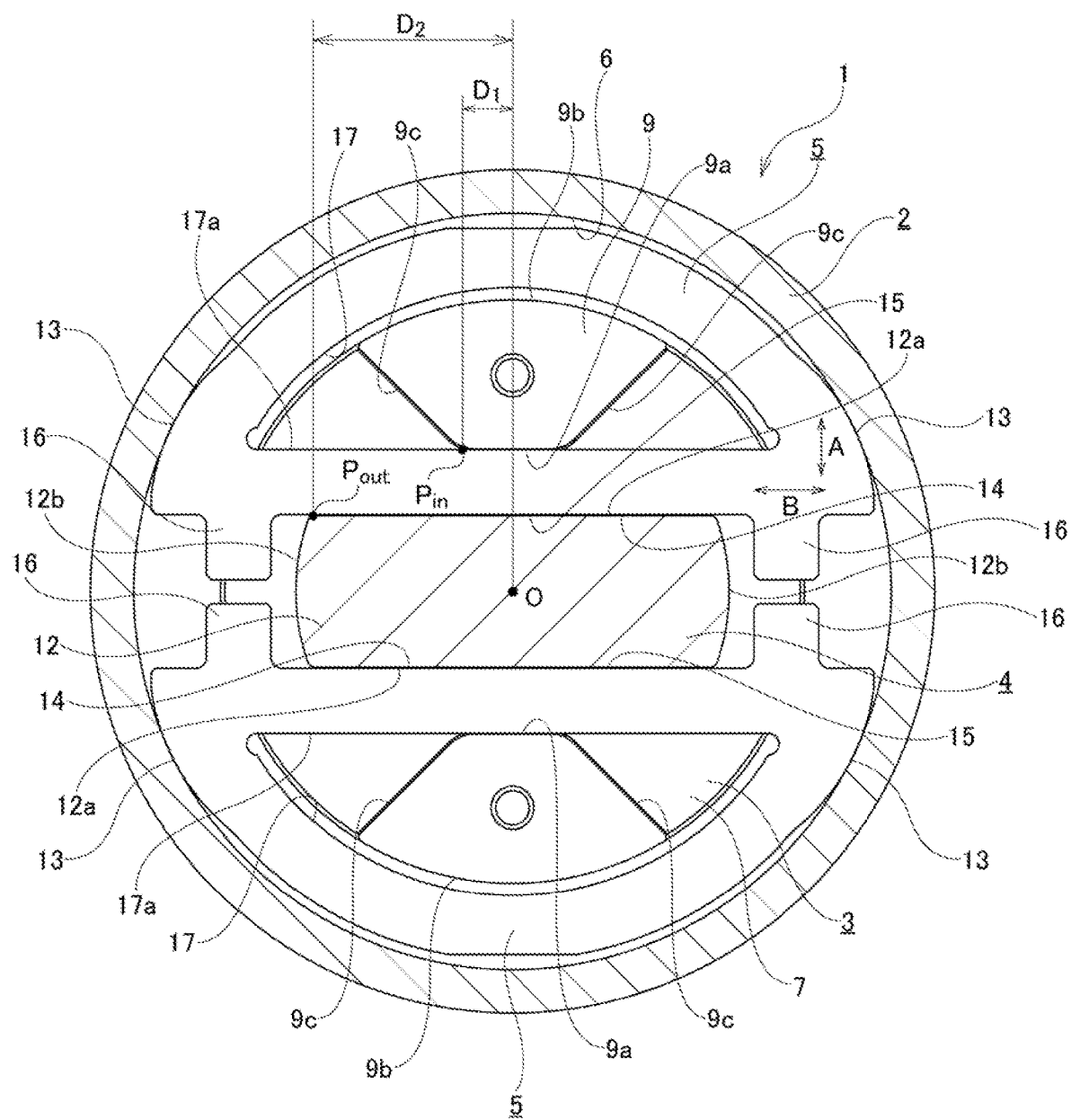
FIG. 3 is a cross-sectional view taken along a line X-X of FIG. 2.

The pair of engagement elements 5 has a substantially semicircular end surface shape when viewed from the axial direction and has a symmetrical shape with respect to the width direction (a direction parallel to a flat surface portion 15 and a direction indicated by an arrow B in FIG. 3).

The pair of engagement elements 5 includes a pair of pressing surfaces 13 provided on the radial outer side surface so that each of them to faces the pressed surface 6 and they are separated from each other in the circumferential direction. Each pressing surface 13 is formed by a partially cylindrical convex curved surface having a curvature radius smaller than the curvature radius of the pressed surface 6. Additionally, the portions circumferentially deviated from the pair of pressing surfaces 13 in the radial outer side surfaces of the pair of engagement elements 5 exist on the radial inside in relation to the virtual circle centered on the center axis O of the input member 3 and contacting the pair of pressing surfaces 13 when viewed from the axial direction. That is, the portions circumferentially deviated from the pair of pressing surfaces 13 in the radial outer side surfaces of the pair of engagement elements 5 do not contact the pressed surface 6 while the pair of pressing surfaces 13 contacts the pressed surface 6.

It is preferable that each pressing surface 13 have surface properties with a larger friction coefficient with respect to the pressed surface 6 than other portions of the engagement element 5. Each pressing surface 13 can be integrally formed with the other portion of the engagement element 5 and can be formed on the surface of the friction material fixed to the other portion of the engagement element 5 by sticking, bonding, or the like.

The pair of engagement elements 5 includes an output side engaged portion 14 which is provided at the center portion of the radial inner side surface in the width direction to engage with the output side engaging portion 12. In this example, the flat surface portion 15 is provided on the radial inner side surfaces of the pair of engagement elements 5 and a pair of convex portions 16 protruding toward the radial inside is provided at two positions of the flat surface portion 15 in the width direction. Then, the output side engaged portion 14 is formed by a portion existing between the pair of convex portions 16 in the width direction in the flat surface portion 15. Additionally, in this example, the width-direction dimension (the gap between the pair of convex portions 16) of the output side engaged portion 14 is set to be larger than the width-direction dimension of the flat surface 12a of the output side engaging portion 12.

Additionally, the radial direction with respect to the engagement element 5 refers to a direction perpendicular to the flat surface portion 15 indicated by the arrow A in FIG. 3 and the width direction with respect to the engagement element 5 refers to a direction parallel to the flat surface portion 15 indicated by the arrow B in FIG. 3. In this example, the radial direction with respect to the engagement element 5 corresponds to a first direction which is a far and near direction with respect to the pressed surface 6 of the pair of pressing surfaces 13 of the engagement element 5 and the width direction with respect to the engagement element 5 corresponds to a second direction orthogonal to both the first direction and the rotation center O of the input member 3.

Furthermore, the pair of engagement elements 5 includes an input side engaged portion 17 which is provided at the radial intermediate portion of the widthwise center portion to engage with the input side engaging portion 9. In this example, the input side engaged portion 17 is formed by a through hole which has a substantially arcuate opening shape when viewed from the axial direction and penetrates the radial intermediate portion at the widthwise center position of the engagement element 5 in the axial direction.

The input side engaged portion 17 has a size that allows the input side engaging portion 9 to be loosely inserted. Thus, a gap exists in each of the width direction and the radial direction of the engagement element 5 between the input side engaging portion 9 and the inner surface of the input side engaged portion 17 while the input side engaging portion 9 is inserted into the input side engaged portion 17. Therefore, the input side engaging portion 9 can be displaced in the rotation direction of the input member 3 with respect to the input side engaged portion 17 (the engagement element 5) and the input side engaged portion 17 can be displaced in the radial direction of the engagement element 5 with respect to the input side engaging portion 9. In this example, the input side engaged portion 17 includes a flat surface 17a which is provided on the radial inner side surface (the surface facing the outside in the radial direction) to be parallel to the flat surface portion 15.

Additionally, when implementing the present invention, the input side engaged portion can also be formed by a bottomed hole that opens only to one axial side of the engagement element. Alternatively, the input side engaged portion can be formed by a notch opening to the radial outer side surface of the engagement element.

In the reverse input blocking clutch 1 of this example, the pair of engagement elements 5 is disposed on the radial inside of the pressed member 2 to be movable in the radial direction (first direction) of the pair of engagement elements 5 while the pair of pressing surfaces 13 of the engagement elements 5 faces the opposite sides in the radial direction and the radial inner side surfaces (flat surface portions 15) of the engagement elements 5 face each other. The pair of input side engaging portions 9 of the input member 3 disposed on one axial side is axially inserted into the input side engaged portions 17 of the pair of engagement elements 5 and the output side engaging portion 12 of the output member 4 disposed on the other axial side is axially inserted between the pair of output side engaged portions 14. That is, the pair of engagement elements 5 is disposed to sandwich the output side engaging portion 12 from the radial outside by their output side engaged portions 14.

Additionally, the inner diameter dimension of the pressed member 2 and the radial dimension of the engagement element 5 are regulated so that a gap exists in at least one of the portion between the pressed surface 6 and the pair of pressing surfaces 13 and the portion between the tip surfaces of the convex portions 16 while the pair of engagement elements 5 is disposed on the radial inside of the pressed member 2.

(Description of Operation of Reverse Input Blocking Clutch)

The operation of the reverse input blocking clutch 1 of this example will be described with reference to FIGS. 4 and 5. Additionally, FIGS. 4 and 5 exaggeratedly show the radial gap of the input member 3, the output member 4, and the pair of engagement elements 5.

First, a case in which a rotational torque is input from the input side mechanism to the input member 3 will be described.

Figure 4:
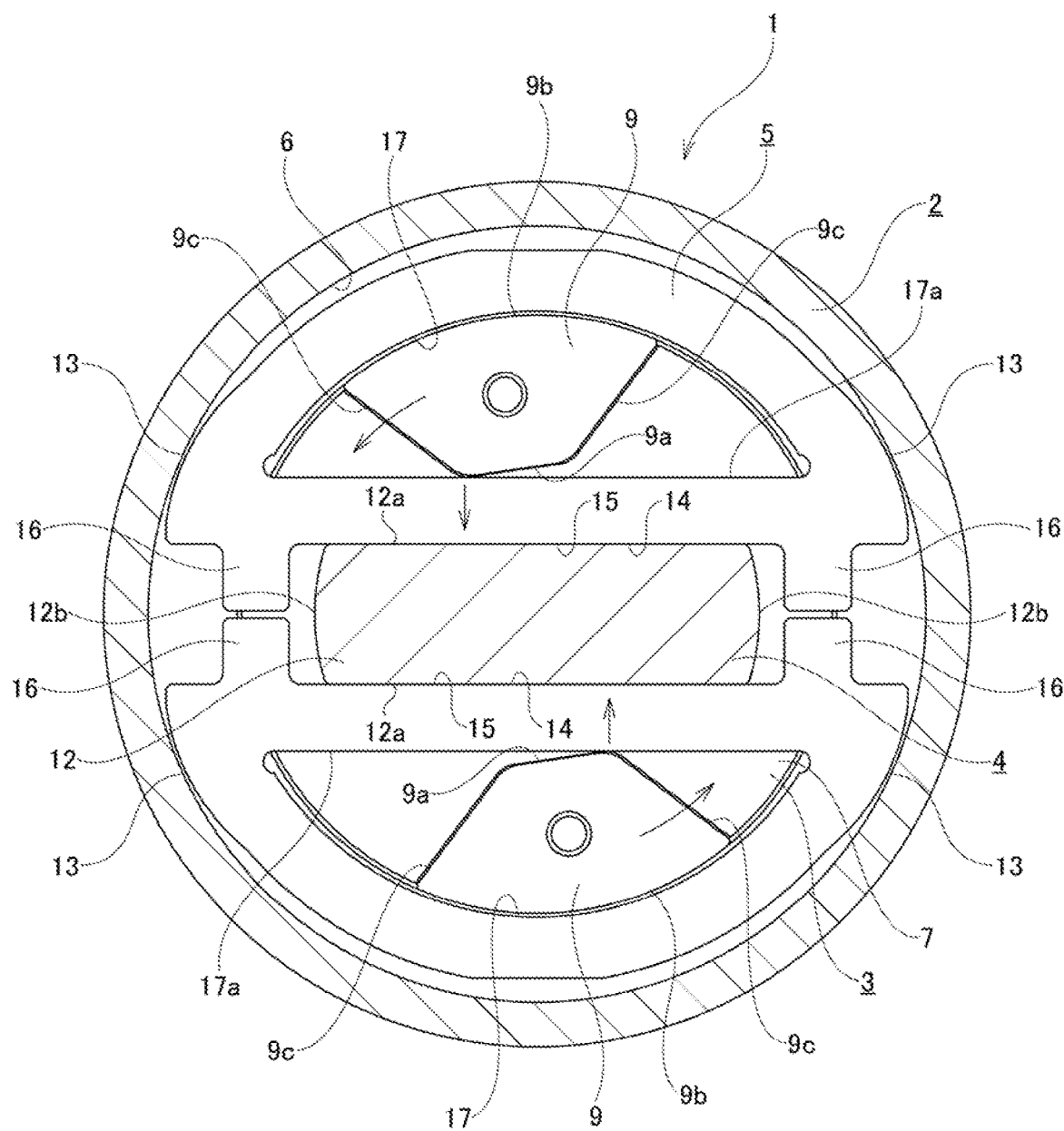
FIG. 4 is a diagram similar to FIG. 3 showing a state in which a rotational torque is input to an input member in the reverse input blocking clutch according to an example of the embodiment.

When the rotational torque is input to the input member 3, the input side engaging portion 9 rotates inside the input side engaged portion 17 in the rotation direction of the input member 3 (in the example of FIG. 4, the counterclockwise direction) as shown in FIG. 4. Then, the radial inner side surface 9a of the input side engaging portion 9 presses the flat surface 17a of the input side engaged portion 17 toward the radial inside so that each of the pair of engagement elements 5 moves in a direction moving away from the pressed surface 6. That is, each of the pair of engagement elements 5 is moved toward the radial inside which is a direction moving close to each other (the engagement element 5 located at the upper side of FIG. 4 is moved downward and the engagement element 5 located at the lower side of FIG. 4 is moved upward) based on the engagement with the input member 3. Accordingly, the radial inner side surfaces of the pair of engagement elements 5 move in a direction moving close to each other and the pair of output side engaged portions 14 sandwich the output side engaging portion 12 of the output member 4 from both radial sides. That is, the output side engaging portion 12 and the pair of output side engaged portions 14 are engaged (contacted) without rattling while the output member 4 is rotated so that the flat surface 12a of the output side engaging portion 12 is parallel to the flat surface portion 15 of the engagement element 5. As a result, the rotational torque input to the input member 3 is transmitted to the output member 4 through the pair of engagement elements and is output from the output member 4. The reverse input blocking clutch 1 of this example moves each of the pair of engagement elements 5 in a direction moving away from the pressed surface 6 regardless of the rotation direction of the input member 3 when the rotational torque is input to the input member 3. Then, the rotational torque input to the input member 3 is transmitted to the output member 4 through the pair of engagement elements 5.

Next, a case in which a rotational torque is reversely input from the output side mechanism to the output member 4 will be described.

Figure 5:
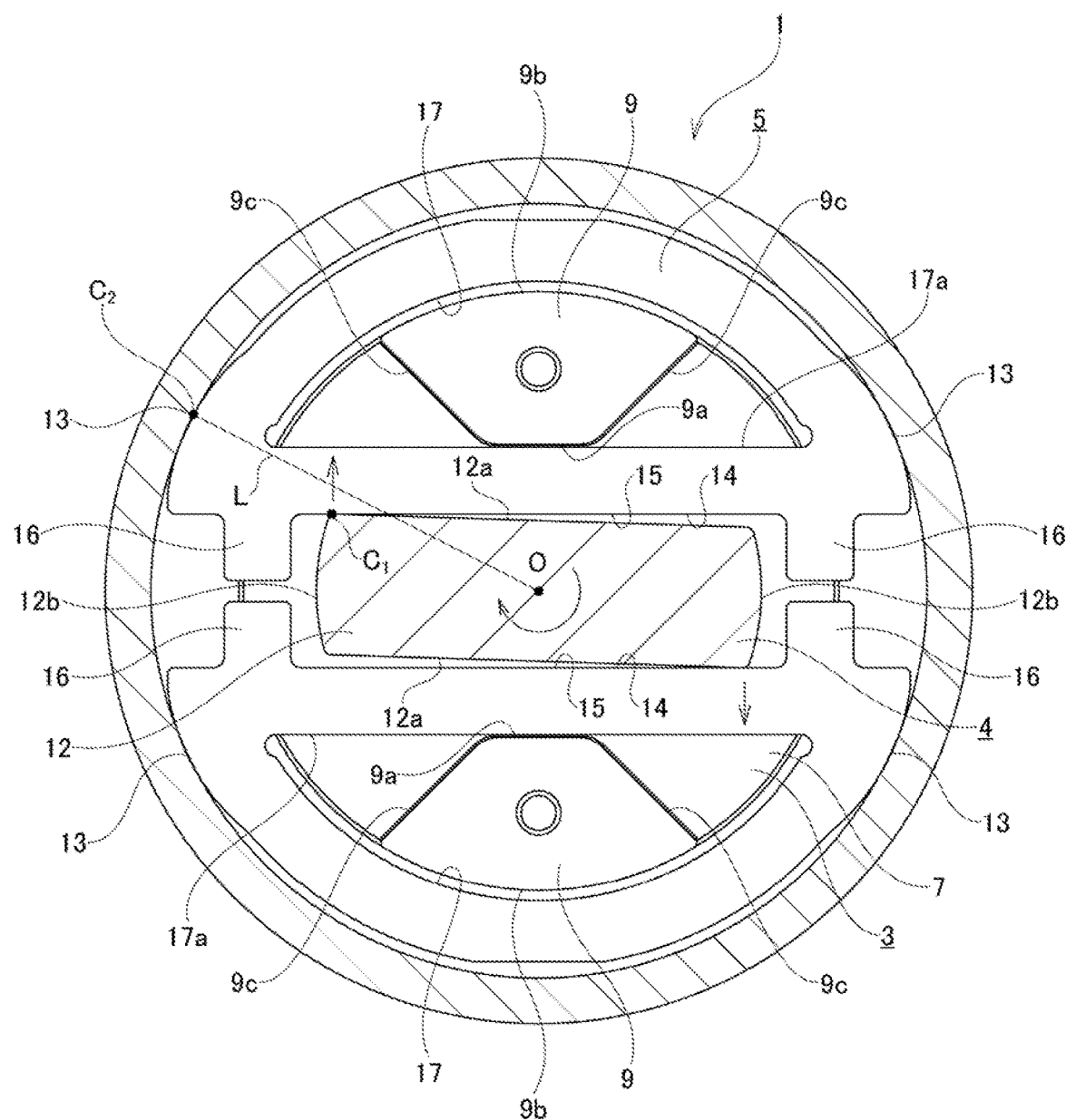
FIG. 5 is a diagram similar to FIG. 3 showing a state in which a rotational torque is reversely input to the output member in the reverse input blocking clutch according to an example of the embodiment.

When the rotational torque is reversely input to the output member 4, the output side engaging portion 12 rotates inside the pair of output side engaged portions 14 in the rotation direction of the output member 4 (in the example of FIG. 5, the clockwise direction) as shown in FIG. 5. Then, the connection portion (corner portion) between the flat surface 12a and the convex curved surface 12b in the outer peripheral surface of the output side engaging portion 12 presses the output side engaged portion 14 toward the radial outside so that each of the pair of engagement elements 5 is moved in a direction moving close to the pressed surface 6. That is, each of the pair of engagement elements 5 is moved toward the radial outside in a direction moving away from each (the engagement element 5 located at the upper side of FIG. 5 is moved upward and the engagement element 5 located at the lower side of FIG. 5 is moved downward) other based on the engagement with the output member 4. Accordingly, the pressing surface 13 of each of the pair of engagement elements 5 is brought into frictional engagement with the pressed surface 6.

As a result, the rotational torque reversely input to the output member 4 is completely blocked and is not transmitted to the input member 3 or only part of the rotational torque reversely input to the output member 4 is transmitted to the input member 3 while the rest is blocked. In order to completely block the rotational torque reversely input to the output member 4 and prevent the rotational torque from being transmitted to the input member 3, the pair of engagement elements 5 is stretched between the output side engaging portion 12 and the pressed member 2 to lock the output member 4 such that the pair of pressing surfaces 13 does not slide (relatively rotate) with respect to the pressed surface 6. On the other hand, in order to transmit only part of the rotational torque reversely input to the output member 4 to the input member 3 while blocking the rest, the pair of engagement elements 5 is stretched between the output side engaging portion 12 and the pressed member 2 to semi-lock the output member 4 such that the pair of pressing surfaces 13 slides with respect to the pressed surface 6.

In the reverse input blocking clutch 1 of this example, the size of the gap between each component is adjusted so that the above operations are possible. Particularly, in the positional relationship in which the pair of pressing surfaces 13 of each engagement element 5 contacts the pressed surface 6, a gap exists between the radial inner side surface 9a of the input side engaging portion 9 and the inner surface of the input side engaged portion 17 so that the pair of pressing surfaces 13 is further pressed toward the pressed surface 6 based on that the corner portion of the output side engaging portion 12 presses the output side engaged portion 14. Accordingly, when the rotational torque is reversely input to the output member 4, the movement of the engagement element 5 toward the radial outside is prevented from being hindered by the input side engaging portion 9 and the output member 4 is appropriately locked or semi-locked in such a manner that a surface pressure applied to the contact portion between the pair of pressing surfaces 13 and the pressed surface 6 changes in accordance with the magnitude of the rotational torque reversely input to the output member 4 even after the pair of pressing surfaces 13 contacts the pressed surface 6.

Furthermore, in the reverse input blocking clutch 1 of this example, the size and shape of each portion of the pressed member 2, the input member 3, the output member 4, and the pair of engagement elements 5 are regulated to satisfy the following relationship.

First, in a state in which the pair of pressing surfaces 13 is pressed against the pressed surface 6 in accordance with the rotation of the output member 4 in a predetermined direction (for example, the clockwise direction of FIG. 3) and the input side engaging portion 9 engages with the input side engaged portion 17 (part of the input side engaging portion 9 contacts the input side engaged portion 17) in accordance with the rotation of the input member 3 in a direction opposite to the predetermined direction (for example, the counterclockwise direction of FIG. 3), a first distance $D_1$ which is a distance of a contact portion $P_{in}$ between the input side engaging portion 9 and the input side engaged portion 17 and the rotation center O of the input member 3 in the second direction is set to be shorter than a second distance $D_2$ of a contact portion Pout between the output side engaging portion 12 and the output side engaged portion 14 and the rotation center O of the output member 4 ($D_1 < D_2$).

As shown in FIG. 5, in a state in which the rotational torque is reversely input to the output member 4 and the pair of pressing surfaces 13 of each engagement element 5 contacts the pressed surface 6 (in the locked or semi-locked state), a contact portion $C_1$ between the output side engaging portion 12 and the output side engaged portion 14 is located on the side close to the rotation center O of the output member 4 (the lower side of FIG. 5) in the first direction in relation to a virtual line L connecting the rotation center O of the output member 4 and a contact portion $C_2$ between the pressed surface 6 and the pressing surface 13 of one of the pair of pressing surfaces 13 (the pressing surface on the side closer to the contact portion $C_1$ than the rotation center O of the output member 4 in the second direction).

According to the reverse input blocking clutch 1 of this example, the axial dimension can be shortened and the number of parts can be reduced.

The reverse input blocking clutch 1 of this example converts the rotation of each of the input member 3 and the output member 4 into the radial movement of the engagement element 5. Then, the engagement element 5 is engaged with the output member 4 located on the radial inside of the engagement element 5 or the engagement element 5 is pressed against the pressed member 2 located on the radial outside of the engagement element 5 such that the rotation of the input member 3 and the output member 4 is converted into the radial movement of the engagement element 5 in this way. In this way, since the reverse input blocking clutch 1 of this example can switch the unlocked or semi-unlocked state of the output member 4 that allows the transmission of the rotational torque from the input member 3 to the output member 4 and the locked or semi-locked state of the output member 4 that prevents or suppresses the rotation of the output member 4 based on the radial movement of the engagement element 5 controlled by the rotation of each of the input member 3 and the output member 4, the axial dimension of the reverse input blocking clutch 1 as a whole can be shortened.

Furthermore, the engagement element 5 has both a function of transmitting the rotational torque input to the input member 3 to the output member 4 and a function of locking or semi-locking the output member 4. Therefore, the number of parts of the reverse input blocking clutch 1 can be reduced and the operation can be stabilized compared to a case in which the rotational torque transmitting function and the locking or semi-locking function are respectively provided in different members. For example, when the rotational torque transmitting function and the locking or semi-locking function are provided in different members, there is a possibility that the unlocking or semi-unlocking timing and the rotational torque transmission start timing do not match. In this case, when the rotational torque is reversely input to the output member during the period from the unlocking or semi-unlocking to the start of transmission of the rotational torque, the output member is locked or semi-locked again. In this example, since the engagement element 5 has both a function of transmitting the rotational torque to the output member 4 and a function of locking or semi-locking the output member 4, such a problem can be prevented.

Since the direction of the force applied from the input member 3 to the engagement element 5 and the direction of the force applied from the output member 4 to the engagement element 5 are opposite to each other, the movement direction of the engagement element 5 can be controlled by regulating the magnitude relationship of both forces. Therefore, it is possible to stably and reliably perform the switching operation of the locked or semi-locked state and the unlocked or semi-unlocked state of the output member 4.

Furthermore, in the reverse input blocking clutch 1 of this example, the first distance $D_1$ is shorter than the second distance $D_2$ and the contact portion $C_1$ is located on the side closer to the rotation center O of the output member 4 in the first direction than the virtual line L in the locked or semi-locked state. Therefore, the locked or semi-locked state can be smoothly switched to the unlocked or semi-unlocked state. This reason will be described with reference to FIGS. 6A to 6C.

When the rotational torque is input to the input member 3 in the locked or semi-locked state of the reverse input blocking clutch 1, each engagement element 5 tends to rotate around the contact portion $C_1$.

Figure 6A:
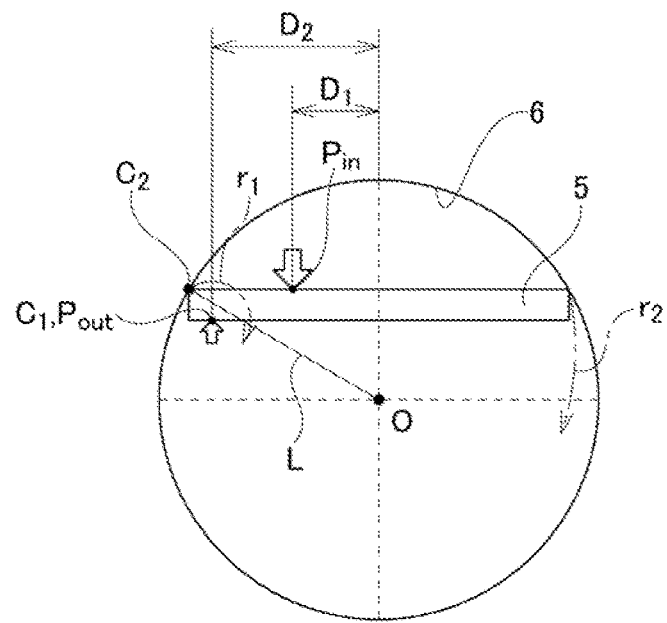
FIG. 6A is a schematic view illustrating the effect of the reverse input blocking clutch according to an example of the embodiment.
Figure 6B:
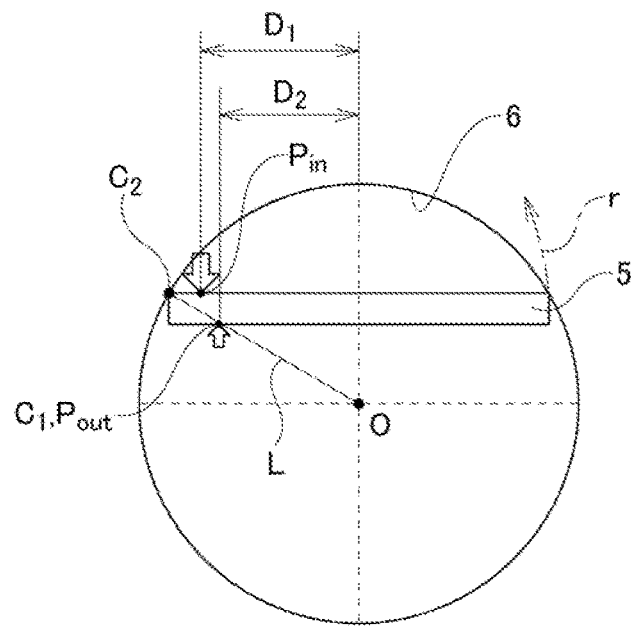
FIG. 6B is a schematic view illustrating the effect of the reverse input blocking clutch according to an example of the embodiment.

If the rotational torque is input to the input member 3 in the counterclockwise direction as shown in FIG. 6B when the first distance $D_1$ is longer than the second distance $D_2$ ($D_1 > D_2$), the engagement element 5 tends to rotate around the contact portion $C_1$ in the counterclockwise direction. Then, as the locus r is indicated by the dashed line in FIG.

6B, the pressing surface 13 located on the side opposite to the contact portion $C_1$ (the right side of FIG. 6B) with the rotation center O of the output member 4 interposed therebetween in the second direction in the pair of pressing surfaces 13 tends to be strongly pressed against and bitten into the pressed surface 6. In order to cancel such biting of the pressing surface 13 into the pressed surface 6, the rotational torque of the input member 3 increases instantly when the locked or semi-locked state is switched to the unlocked or semi-unlocked state (a peak torque occurs).

Figure 6C:
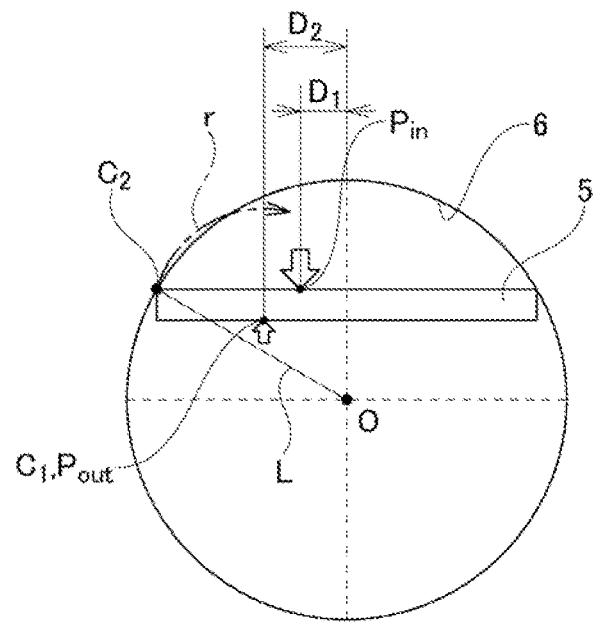
FIG. 6C is a schematic view illustrating the effect of the reverse input blocking clutch according to an example of the embodiment.

If the rotational torque is input to the input member 3 in the counterclockwise direction as shown in FIG. 6C when the contact portion $C_1$ is located on the side farther from the rotation center O of the output member 4 in the first direction than the virtual line L, the engagement element 5 tends to rotate around the contact portion $C_1$ in the clockwise direction. Then, as the locus r is indicated by the dashed line in FIG. 6C, the pressing surface 13 located on the side closer to the contact portion $C_1$ than the rotation center O of the output member 4 in the second direction (the left side of FIG. 6C) in the pair of pressing surfaces 13 tends to be strongly pressed against and bitten into the pressed surface 6. In order to cancel such biting of the pressing surface 13 into the pressed surface 6, the rotational torque of the input member 3 increases instantly when the locked or semi-locked state is switched to the unlocked or semi-unlocked state.

On the other hand, when the first distance $D_1$ is shorter than the second distance $D_2$ ($D_1<D_2$) and the contact portion $C_1$ is located on the side closer to the rotation center O of the output member 4 in the first direction than the virtual line L as in the reverse input blocking clutch 1 of this example, the engagement element 5 tends to rotate around the contact portion $C_1$ in the clockwise direction when the rotational torque is input to the input member 3 in the counterclockwise direction as shown in FIG. 6A. However, as the locus $r_1$ and the locus $r_2$ are indicated by the dashed lines in FIG. 6A, none of the pair of pressing surfaces 13 is pressed against the pressed surface 6. Therefore, even when the locked or semi-locked state is switched to the unlocked or semi-unlocked state, the rotational torque of the input member 3 does not increase instantly and the locked or semi-locked state can be smoothly switched to the unlocked or semi-unlocked state. Furthermore, since the peak torque does not occur, there is no need to unnecessarily increase the maximum output torque of the input side mechanism and it is possible to prevent an unnecessary increase in size of the input side mechanism.

According to the reverse input blocking clutch 1 of this example, a structure capable of smoothly switching the locked or semi-locked state to the unlocked or semi-unlocked state can be realized without configuring the engagement element to include the engagement element body and the link member as in the reverse input blocking clutch described in the pamphlet of WO 2021/054481. Therefore, the number of parts can be reduced and the manufacturing cost can be reduced. Additionally, in FIGS. 6A to 6C, the contact portion P in and the contact portion $C_2$ are located at the same height in the first direction, but it is possible to obtain the same effects as those described above even when the positions of the contact portion P in and the contact portion $C_2$ in the first direction are different.

Figure 7:
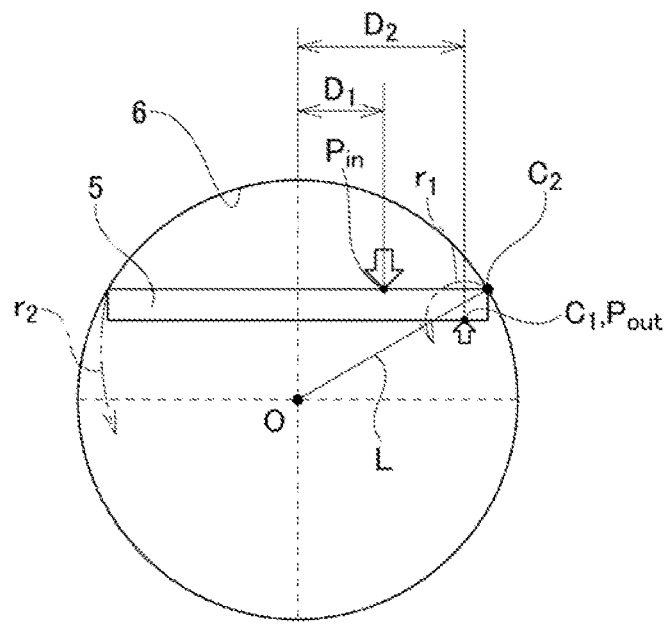
FIG. 7 is a schematic view illustrating the effect of the reverse input blocking clutch according to an example of the embodiment.

FIG. 7 is a schematic view illustrating the effect of the reverse input blocking clutch according to an example of the embodiment. FIG. 7 shows an example of a case in which the input member 3 rotates in a direction opposite to the example shown in FIGS. 6A to 6C (that is, the clockwise direction).

In the above-described embodiment, an example of a case in which the input member 3 rotates in the counterclockwise direction while the pair of pressing surfaces 13 is pressed against the pressed surface 6 and the input side engaging portion 9 engages with the input side engaged portion 17 has been described, but the same operation and effect can be obtained even in the case in which the input member 3 rotates in the clockwise direction. That is, even when the contact portion $P_{in}$ between the input side engaging portion 9 and the input side engaged portion 17 as a force point is located on the right side in relation to the rotation center O of the output member 4 as shown in FIG. 7, the occurrence of the biting is suppressed and the unlocking performance can be improved as in the above-described embodiment in which the contact portion $P_{in}$ is located on the left side in relation to the rotation center O of the output member 4. That is, when the first distance $D_1$ is shorter than the second distance $D_2$ ($D_1<D_2$) and the contact portion $C_1$ is located on the side closer to the rotation center O of the output member 4 in the first direction than the virtual line L, the engagement element 5 tends to rotate around the contact portion $C_1$ in the counterclockwise direction when the rotational torque is input to the input member 3 in the clockwise direction as shown in FIG. 7. However, as the locus $r_1$ and the locus $r_2$ are indicated by the dashed lines in FIG. 7, none of the pair of pressing surfaces 13 is pressed against the pressed surface 6. Therefore, even when the locked or semi-locked state is switched to the unlocked or semi-unlocked state, the rotational torque of the input member 3 does not increase instantly and the locked or semi-locked state can be smoothly switched to the unlocked or semi-unlocked state. Furthermore, since the peak torque does not occur, there is no need to unnecessarily increase the maximum output torque of the input side mechanism and it is possible to prevent an unnecessary increase in size of the input side mechanism.

Additionally, when implementing the reverse input blocking clutch of the present invention, the number of the engagement elements can be one or three or more.

When implementing the reverse input blocking clutch of the present invention, it is also possible to provide an elastic member that elastically urges the engagement element in a direction to bring the pair of pressing surfaces closer to the pressed surface. The elastic member can be composed of, for example, a torsion coil spring, a leaf spring, or the like. When a pair of the engagement elements is provided and the elastic member is a torsion coil spring, the convex portion (the convex portion 16 shown in FIG. 1 and FIGS. 3 to 5 of this example) provided in the engagement element is inserted into the end portion of the torsion coil spring to hold the torsion coil spring.

The materials of the input member, the output member, the pressed member, and the engagement element are not particularly limited. For example, as these materials, in addition to metals such as iron alloys, copper alloys, and aluminum alloys, synthetic resins mixed with reinforcing fibers may be used as necessary. The input member, the output member, the pressed member, and the engagement element may be made of the same material or different materials.

If the condition that the output member is locked or semi-locked is satisfied when the rotational torque is reversely input to the output member, a lubricant can also be interposed in the portions in which the input member, the output member, the pressed member, and the engagement element contact each other. Therefore, for example, at least one of the input member, the output member, the pressed member, and the engagement element may be made of oil-impregnated metal.

REFERENCE SIGNS LIST

1 Reverse input blocking clutch
2 Pressed member
3 Input member
4 Output member
5 Engagement element
6 Pressed surface
7 Substrate portion
8 Input shaft portion
9 Input side engaging portion
9a Radial inner side surface
9b Radial outer side surface
9c Circumferential side surface
10a Input side connection portion
10b Output side connection portion
11 Output shaft portion
12 Output side engaging portion
12a Flat surface
12b Convex curved surface
13 Pressing surface
14 Output side engaged portion
15 Flat surface portion
16 Convex portion
17 Input side engaged portion
17a Flat surface
18 Flange portion

The invention claimed is:

1. A reverse input blocking clutch comprising:
a pressed member that includes a pressed surface provided on an inner peripheral surface;
an input member that includes at least one input side engaging portion disposed on a radial inside of the pressed surface and is disposed coaxially with the pressed surface;
an output member that includes an output side engaging portion disposed on the radial inside in relation to the input side engaging portion on the radial inside of the pressed surface and is disposed coaxially with the pressed surface; and
an engagement element which includes a pair of pressing surfaces each facing the pressed surface and circumferentially separated from each other, an input side engaged portion engageable with the input side engaging portion, and an output side engaged portion engageable with the output side engaging portion and is disposed to be movable in a first radial direction with respect to the pressed surface,
wherein the engagement element is configured to be displaced in the first radial direction moving away from the pressed surface based on that the input side engaging portion engages with the input side engaged portion when the rotational torque is input to the input member and is configured to transmit a rotational torque input to the input member to the output member based on that the output side engaged portion engages with the output side engaging portion and wherein the engagement element is configured to press the pressing surface against the pressed surface so that the pair of pressing surfaces frictionally engages with the pressed surface based on that the output side engaging portion engages with the output side engaged portion when a rotational torque is reversely input to the output member,
wherein in a state in which the pair of pressing surfaces is pressed against the pressed surface in accordance with the rotation of the output member in a predetermined direction and the input side engaging portion engages with the input side engaged portion in accordance with the rotation of the input member in a direction opposite to the predetermined direction, a distance between a rotation center of the input member and a contact portion between the input side engaging portion and the input side engaged portion in a second radial direction orthogonal to the first radial direction is shorter than a distance between a rotation center of the output member and a contact portion between the output side engaging portion and the output side engaged portion in the second radial direction, and
wherein in a state in which the rotational torque is reversely input to the output member and the pair of pressing surfaces contacts the pressed surface, the contact portion between the output side engaging portion and the output side engaged portion is located on the side closer to the rotation center of the output member in the first radial direction in relation to a virtual line connecting a contact portion between one pressing surface of the pair of pressing surfaces and the pressed surface and the rotation center of the output member.

2. The reverse input blocking clutch according to claim 1, wherein the engagement element is provided as a pair and the input member includes a pair of the input side engaging portions.

* * * * *